US010791534B1

(12) United States Patent
Parchami et al.

(10) Patent No.: US 10,791,534 B1
(45) Date of Patent: Sep. 29, 2020

(54) SYNCHRONIZING SENSING SYSTEMS

(71) Applicant: Ford Global Technologies, LLC, Dearborn, MI (US)

(72) Inventors: Mostafa Parchami, Dearborn, MI (US); Linjun Zhang, Canton, MI (US); Helen Elizabeth Kourous-Harrigan, Monroe, MI (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 40 days.

(21) Appl. No.: 16/402,340

(22) Filed: May 3, 2019

(51) Int. Cl.
*H04W 56/00* (2009.01)
*H04W 4/44* (2018.01)

(52) U.S. Cl.
CPC .......... *H04W 56/005* (2013.01); *H04W 4/44* (2018.02)

(58) Field of Classification Search
CPC ............................. H04W 56/005; H04W 4/44
See application file for complete search history.

(56) References Cited

U.S. PATENT DOCUMENTS

| 9,994,316 | B1* | 6/2018 | Navot | B64C 39/02 |
| 10,101,747 | B2* | 10/2018 | Tascione | B60W 30/08 |
| 2003/0109264 | A1* | 6/2003 | Syrjarinne | H04W 64/00 |
|  |  |  |  | 455/456.1 |
| 2007/0018891 | A1* | 1/2007 | Golden | G01S 13/767 |
|  |  |  |  | 342/420 |
| 2019/0037515 | A1* | 1/2019 | Shamir | H04J 3/0664 |

FOREIGN PATENT DOCUMENTS

WO    2012019617 A1    2/2012

OTHER PUBLICATIONS

Albrektsen, et al., "SyncBoard—A high accuracy sensor timing board for UAV payloads", 2017 International Conference on Unmanned Aircraft Systems (ICUAS), Jun. 13-16, 2017.
Kaugerand et al., "Time-selective data fusion for in-network processing in ad hoc wireless sensor networks", International Journal of Distributed Sensor Networks, 2018, vol. 14(11).
Olson, "A Passive Solution to the Sensor Synchronization Problem", The 2010 IEEE/RSJ International Conference on Intelligent Robots and Systems, Oct. 18-22, 2010.

* cited by examiner

*Primary Examiner* — Afshawn M Towfighi
(74) *Attorney, Agent, or Firm* — Frank A. MacKenzie; Bejin Bieneman PLC

(57) ABSTRACT

In a message receiver, a receipt timestamp is assigned according to a time of wirelessly receiving a message. Object data about an object is extracted from the message, including a timestamp adjustment for the object from a message sender. An estimated sender capture timestamp is assigned to the object by subtracting the timestamp adjustment and an estimated message transmission latency from the receipt timestamp; a receiver capture timestamp is assigned to receiver object data captured in the receiver. The sender object data and the receiver object data are combined according to the estimated sender capture timestamp and the receiver capture timestamp, thereby generating combined object data.

20 Claims, 6 Drawing Sheets

US 10,791,534 B1

SYNCHRONIZING SENSING SYSTEMS

BACKGROUND

Vehicle-to-infrastructure (V2I) and vehicle-to-vehicle (V2V) communications can allow can allow for vehicles to provide each other and/or infrastructure elements with data about objects in an environment local to vehicle(s) and infrastructure(s), and vice-versa. For example, the infrastructure element may be able to provide data about objects, hazards, etc., in the area to support a vehicle's path planning, e.g., avoidance of hazards and objects, and/or vehicles may be able to provide each other with such data.

DETAILED DESCRIPTION

Overview

Figure 1:
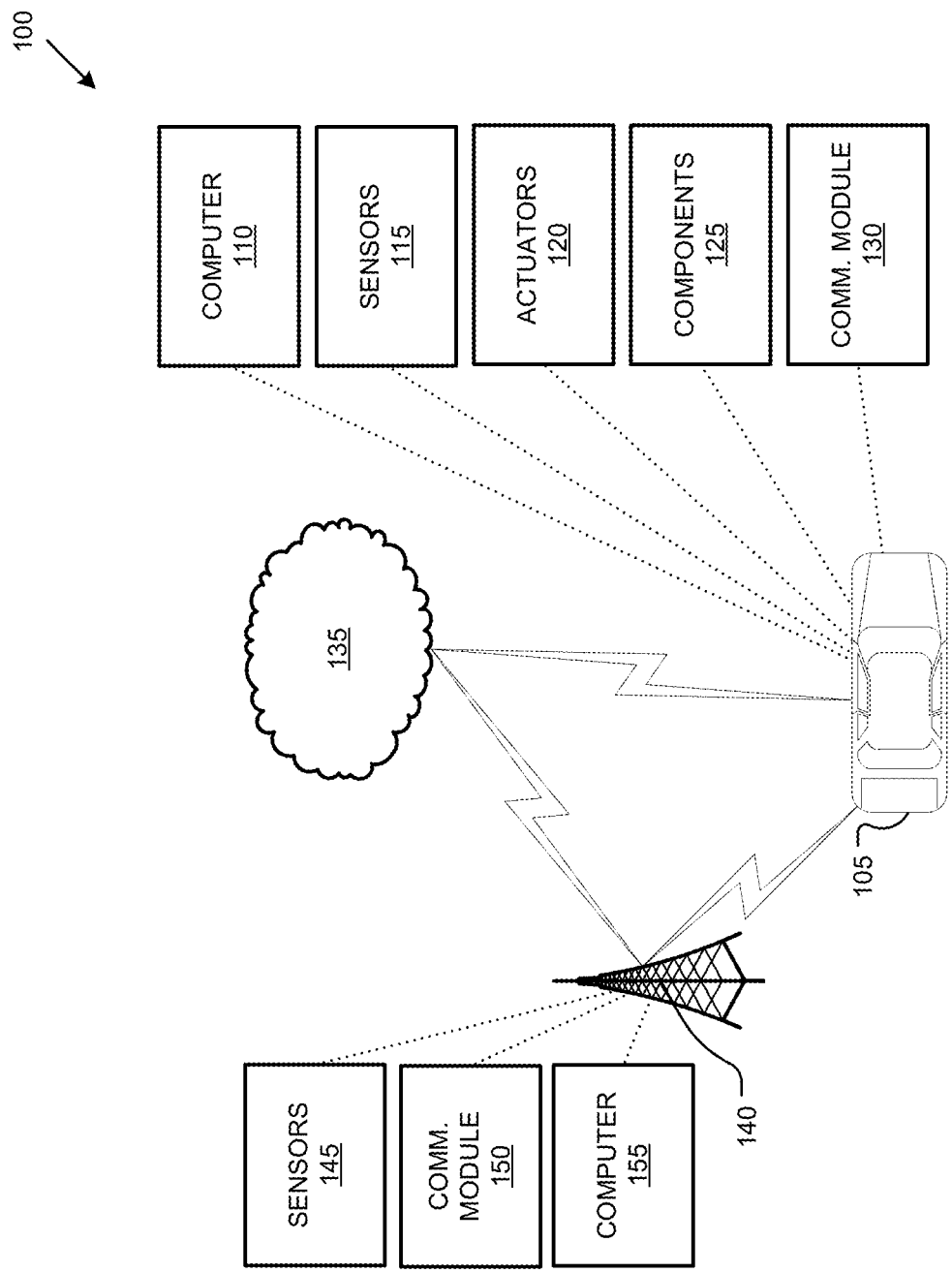
FIG. 1 is a block diagram illustrating an example traffic communications and control system.

A system, comprised a computer including a processor and a memory, the memory storing instructions executable by the processor to assign, in a message receiver, a receipt timestamp according to a time of wirelessly receiving a message; extract from the message sender object data about an object, including a timestamp adjustment for the object from a message sender; assign an estimated sender capture timestamp to the object by subtracting the timestamp adjustment and an estimated message transmission latency from the receipt timestamp; assign a receiver capture timestamp to receiver object data captured in the receiver; and combine the sender object data and the receiver object data according to the estimated sender capture timestamp and the receiver capture timestamp, thereby generating combined object data. The message receiver or the message sender can be a computer in a vehicle. The message receiver or the message sender can be a computer in a stationary infrastructure element. The instructions can further instructions to actuate a component in a vehicle based on the combined object data. The instructions can further instructions to transmit the combined object data. The timestamp adjustment can be a difference between a time of object perception and object data capture. The message transmission latency can be an empirically determined estimate of a time for the message to travel from the sender to the receiver. The sender object data can include a classification, a location, or a dimension of the object. The instructions can further instructions to combine the sender object data and the receiver object data upon determining that the estimated sender capture timestamp and the receiver capture timestamp are within a specified threshold time of each other. The instructions can further instructions to receive the message and extract the sender object data substantially concurrently with capturing the receiver object data and assigning the receiver capture timestamp.

A method comprises assigning, in a message receiver, a receipt timestamp according to a time of wirelessly receiving a message; extracting from the message sender object data about an object, including a timestamp adjustment for the object from a message sender; assigning an estimated sender capture timestamp to the object by subtracting the timestamp adjustment and an estimated message transmission latency from the receipt timestamp; assigning a receiver capture timestamp to receiver object data captured in the receiver; and combining the sender object data and the receiver object data according to the estimated sender capture timestamp and the receiver capture timestamp, thereby generating combined object data. The message receiver or the message sender can be a computer in a vehicle. The message receiver or the message sender can be a computer in a stationary infrastructure element. The method can further comprise actuating a component in a vehicle based on the combined object data. The method can further comprise transmitting the combined object data. The timestamp adjustment can be a difference between a time of object perception and object data capture. The message transmission latency can be an empirically determined estimate of a time for the message to travel from the sender to the receiver. The sender object data can include a classification, a location, or a dimension of the object. The method can further comprise combining the sender object data and the receiver object data upon determining that the estimated sender capture timestamp and the receiver capture timestamp are within a specified threshold time of each other. The method can further comprise receiving the message and extract the sender object data substantially concurrently with capturing the receiver object data and assigning the receiver capture timestamp.

Exemplary System

Introduction

Figure 2:
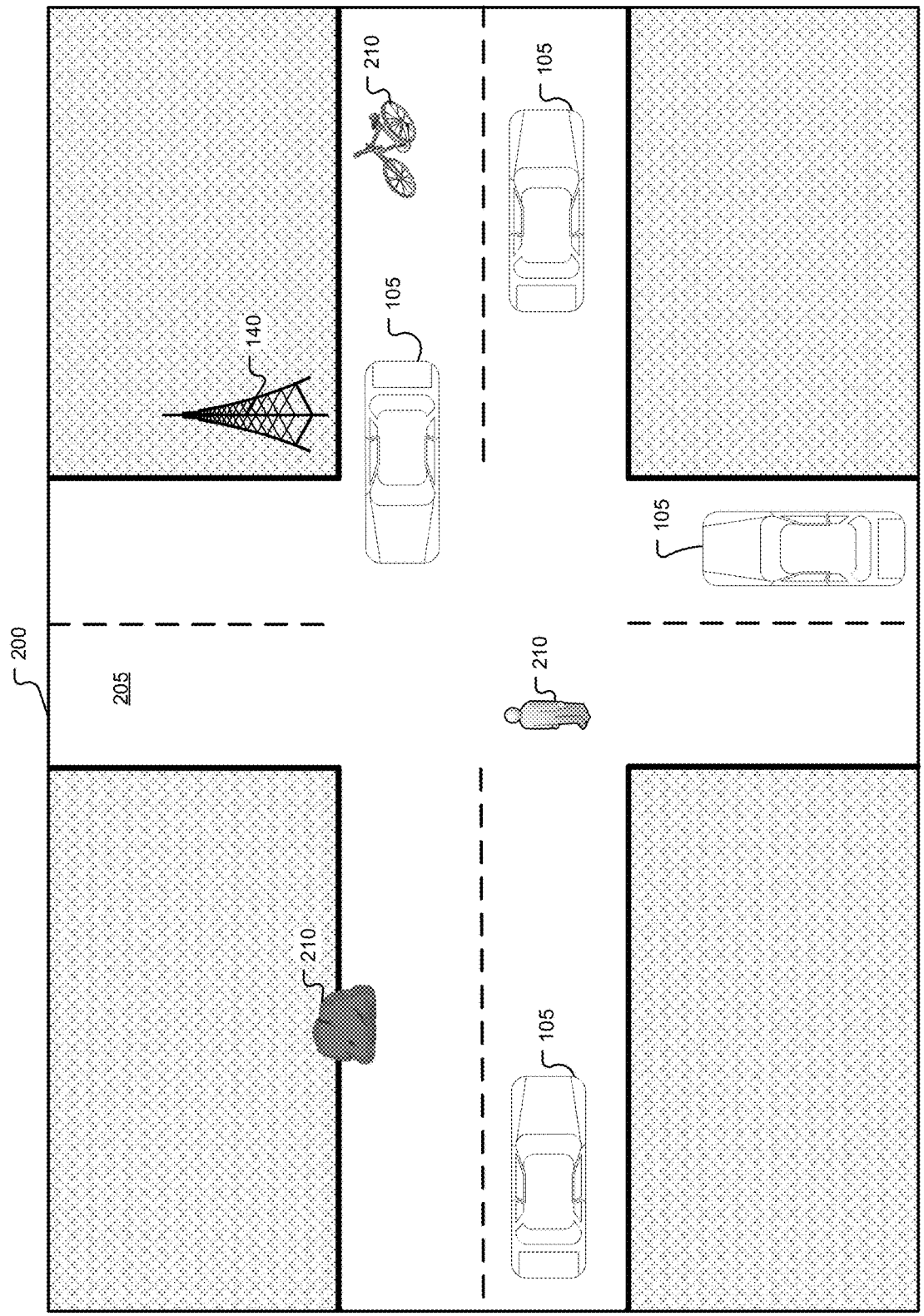
FIG. 2 is a diagram illustrating an example traffic scene in which the system of FIG. 1 could be implemented.
Figure 3:
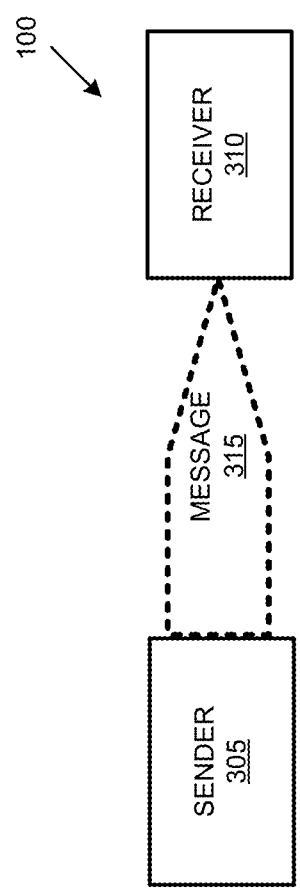
FIG. 3 is a simplified block diagram of a sender sending a message to a receiver in the context of the system of FIG. 1.

FIG. 1 is a block diagram of an example infrastructure communications and control system (or infrastructure system) 100. One or more vehicles 105 can provide data to each other and/or to one or more infrastructure elements 140. One each of a vehicle 105 and infrastructure element 140 are shown in FIG. 1 for ease of illustration; FIG. 2 illustrates a traffic scene or area 200 in which an infrastructure element 140 and a plurality of vehicles may exchange data with one another, e.g., data about roads 205, objects 210, and other features of a local environment. Systems and methods are disclosed herein for synchronizing data from different sources, e.g., sensors 115, 145 in different vehicles 105 and/or infrastructure elements 140, FIG. 3 is a simplified or generalized block diagram illustrating the transmission of data including sensor 115, 145 data and/or data about objects. In the context of FIG. 3, a sender 305 and/or a receiver 310 of a message 315 transmitted from the sender 305 to the receiver 310 can be either of a vehicle 105 or an infrastructure 140. Data in messages 315 can include data from vehicle 105 sensors 115 or infrastructure 140 sensors 145. As disclosed herein, a sender 305 can provide in a message 315 one or more timestamps as discussed below for data in the message 315. A receiver 310 of the message 315 can further determine one or more timestamps for data acquired by receiver 310 sensor(s) 115, 145. The receiver 310 can then synchronize a timestamp of data from a sender 305 with data acquired in the sender 305, thereby allowing for fusion of data from the sender 305 and receiver 310, e.g., so that data from a respective sender 305 and receiver 310 can be fused in the receiver 310 to identify objects relevant to vehicle 105 operation, e.g., safe navigation, collision-avoidance, etc.

The system 100 resolves problems that exist with respect to synchronizing data that is sent and received via V2V and V2I communications and the like, and advantageously allows a data message receiver to fuse data from a sender 305 with data sensed in the receiver 310 without resorting to an external clock to synchronize the respective sender 305 and receiver 310 data. For example, existing techniques can require a global or external reference clock, such as provided via the global position system (GPS) or the like. Synchronizing data with such an external clock can be expensive in terms of processing and message bandwidth; these processing and bandwidth demands are eliminated by the techniques disclosed herein. It is advantageous to avoid consulting an external clock for synchronization.

Vehicle

A vehicle 105, typically (but not necessarily) is a land vehicle such as a car, truck, etc. Additionally or alternatively, a vehicle 105 may include a bicycle, a motorcycle, etc. A vehicle 105 includes a vehicle computer 110, sensors 115, actuators 120 to actuate various vehicle components 125, and a vehicle communications module 130. The communications module 130 allows the vehicle computer 110 to communicate with one or more infrastructure elements 140 and a central server 170, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, a human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications (cellular and/or DSRC., etc.) to another vehicle, to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 can include cellular, Bluetooth, IEEE 802.11, dedicated short range communications (DSRC), cellular V2X (CV2X), and the like.

Network

The network 135 represents one or more mechanisms by which a vehicle computer 110 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Infrastructure Element

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

Example Environment

Turning to FIG. 2, an infrastructure element 140 can be provided to monitor defined area 200 around the infrastructure element 140. For example, the defined area 200 could be an area that is proximate to the infrastructure element 140. In the present context, "proximate" means that the area 200 is defined by a field of view of one or more element 140 sensors 145. The defined area 200 could alternatively be an area defined by a radius around the element 140 or some other distance or set of distances relative to the infrastructure element 140.

In addition to vehicles 105, an area 200 can include other objects 210, e.g., a pedestrian object 210, a boulder object 210, a bicycle object 210, etc., i.e., an area 200 could alternatively or additionally include many other objects 210, e.g., bumps, potholes, curbs, berms, fallen trees, litter, construction barriers or cones, etc. Objects 210 can be specified as being located according to a coordinate system for an area 200 maintained by a vehicle computer 110 and/or infrastructure 140 computer 155, e.g., according to a Cartesian coordinate system or the like specifying coordinates in the area 200. Additionally, data about an object 210 could specify characteristics of a hazard or object in a sub-area such as on or near a road 205, e.g., a height, a width, etc.

Data and Messages

FIG. 3 is a simplified block diagram of a sender 305 sending a message 315 to a receiver 310 in the context of the system 100 of FIG. 1. As is known, computers 110, 155 can be programmed to encode and serialize, i.e., convert to a string of bits, data, such as data describing objects 210, so that the data can be included in a message 315 comprising packets that include the serialized data (or, in each of a plurality of packets, a portion thereof) as a payload, the message being transmitted to or from vehicle(s) 105 and/or infrastructure(s) 140, i.e., senders 305 and receivers 310. A sender 305 or a receiver can each be a vehicle 105 or infrastructure element 140 (e.g., via a communications module 130, 150). Further, the system 100 can include a plurality of senders 305 and/or a plurality of receivers 310. For example, as discussed further below, a receiver 310 could receive a plurality of messages 315 about an object 210 from a respective senders 305.

Table 1 lists and explains data values used to synchronize data between a sender 305 and a receiver 310 and/or respective data from a plurality of senders 305 with data in a receiver 310. The data values included in Table 1 include timestamps. The term "timestamp" as used herein is intended to have its plain and ordinary meaning. However, for clarity and avoidance of doubt, a "timestamp" herein should be understood to specify a clock time stored or recorded for an acquisition and/or determination of a data value. The clock time can be a clock time maintained by a computer 110, 155.

TABLE 1

| Variable | Explanation |
| --- | --- |
| $t_{capture}$ | A timestamp assigned by a sensor 115, 145 specifying a time that a datum or data about an object 210 was acquired. For example, a camera sensor 115, 145 could acquire an image including data in the form of pixels, and the timestamp would specify a time at which the image data were acquired. In another example, a lidar sensor could assign a timestamp specifying a time at which data provided in a lidar point cloud were acquired. In some instances, $t_{capture}$ may represent an average, a highest value, a lowest values, or some other statistical measure of a plurality of respective times when respective sensors 115, 145 captured data about an object 210. The notations $t_{capture\_s}$ and $t_{capture\_r}$ are used herein to refer to timestamps recorded by computers 110, 155 in senders 305 and receivers 310, respectively (i.e., sender 305 capture timestamps and receiver 310 capture timestamps). |
| $t_{percept}$ | A timestamp assigned by a computer 110, 155 specifying when an object's perception is completed, e.g., according to a data fusion process such as is known (or as may hereafter be developed) whereby data from multiple sensors 115, 145 is processed to identify an object 210, e.g., specify a location in terms of area 200 coordinates and/or global geo-coordinates, specify a class of object (i.e., a type of object such as pedestrian, bicycle, rock, etc.), perceived object motion such as speed, heading, acceleration, etc. The notations $t_{percept\_s}$ and $t_{percept\_r}$ are used herein to refer to timestamps recorded by computers 110, 155 in senders 305 and receivers 310, respectively. |
| $t\_diff_{obj}$ | Difference between a time when an object is perceived and a time (or statistical representative of a time, as explained above) when data about the object is captured, i.e., $t\_diff_{obj} = t_{percept} - t_{capture}$. |
| $t_{rcpt}$ | A timestamp, sometimes called a receipt timestamp, assigned by a receiver 310 computer 110, 155 to specify a time when a message is received in the receiver 310. |
| $t_{obj}$ | A timestamp, sometimes called an estimated sender capture timestamp, assigned by a receiver 310 computer 110, 155 to estimate a time of perception in a sender 305 computer 110, 155 by accounting for the time of receiving a message 315, the difference in time of perception and capture of data about an object 210 in the sender 305, and an estimated communication latency between the sender 305 and receiver 310, i.e., $t_{obj} = t_{rcpt} - t\_diff_{obj} - L$ |
| L | A communications latency, i.e., an estimated time (or latency) between a time when a sender 305 sends a message 315, and a time $t_{rcpt}$ when a receiver 310 receives the message 315. L in practice is typically a statistical estimate of measured latencies for a communications medium, but could also be a theoretically determined limit or a limit specified for a standard (e.g., as specified for DSRC). |

Latency Determination

Figure 4:
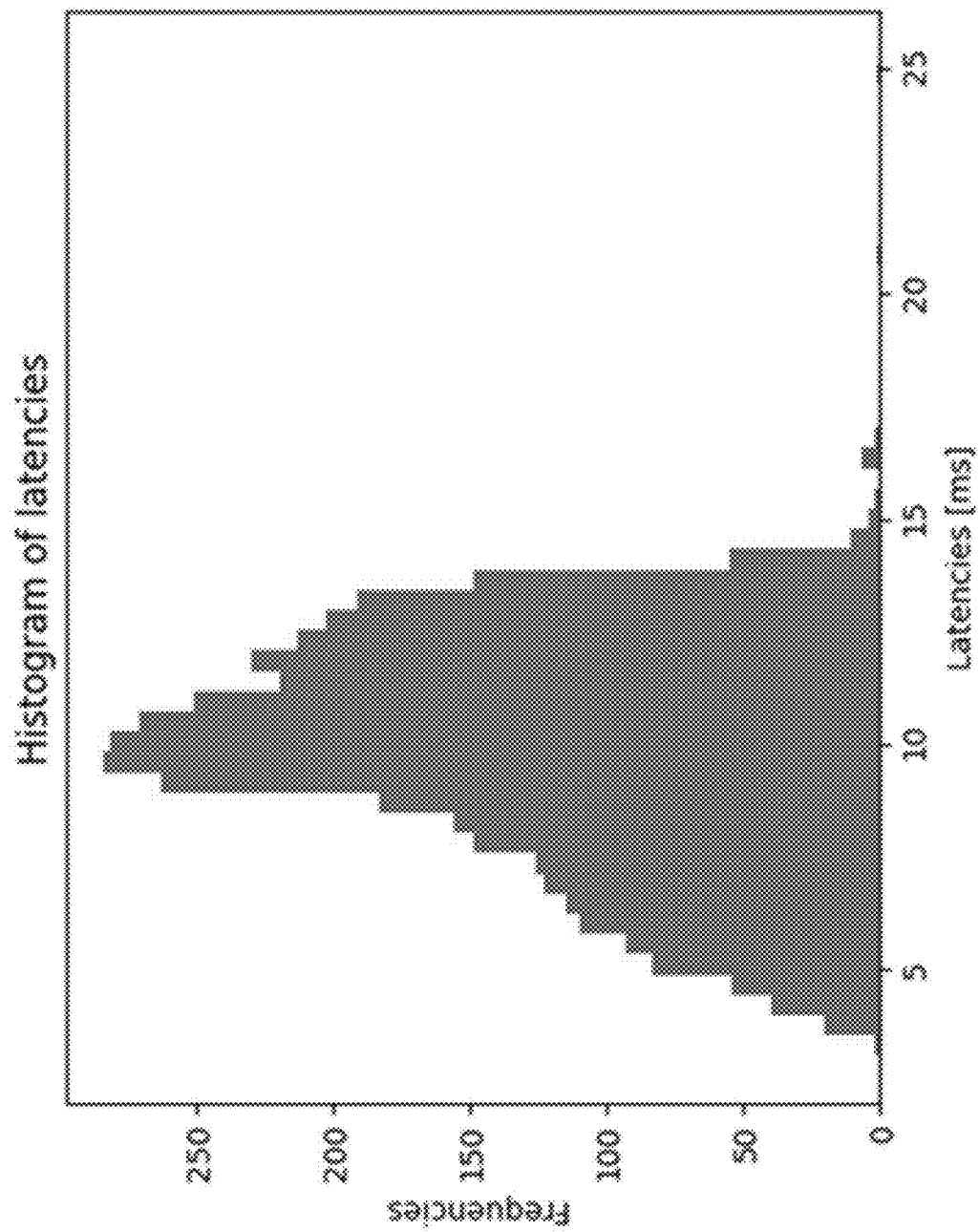
FIG. 4 is a graph showing empirical communication latencies between a sender and a receiver.

FIG. 4 is a graph showing empirical communication latencies between a sender and a receiver. FIG. 4 was generated by sending DSRC communications between various senders 350 and receivers 310 and recording times of transmission and reception. The horizontal axis, labeled "Latencies (ms)," represents a latency time (in milliseconds), i.e., an amount of time between a time of transmission from a sender 305 to a time of reception in a receiver 310 for a message 315. The vertical axis, labeled "Frequencies," represents a frequency with which a latency of a particular amount was recorded, i.e., a number of times that that latency occurred during the test. For example, FIG. 4 shows that the most frequent latency in the test was 10 ms. Accordingly, 10 ms could be selected for the latency L.

Processes

Figure 5:
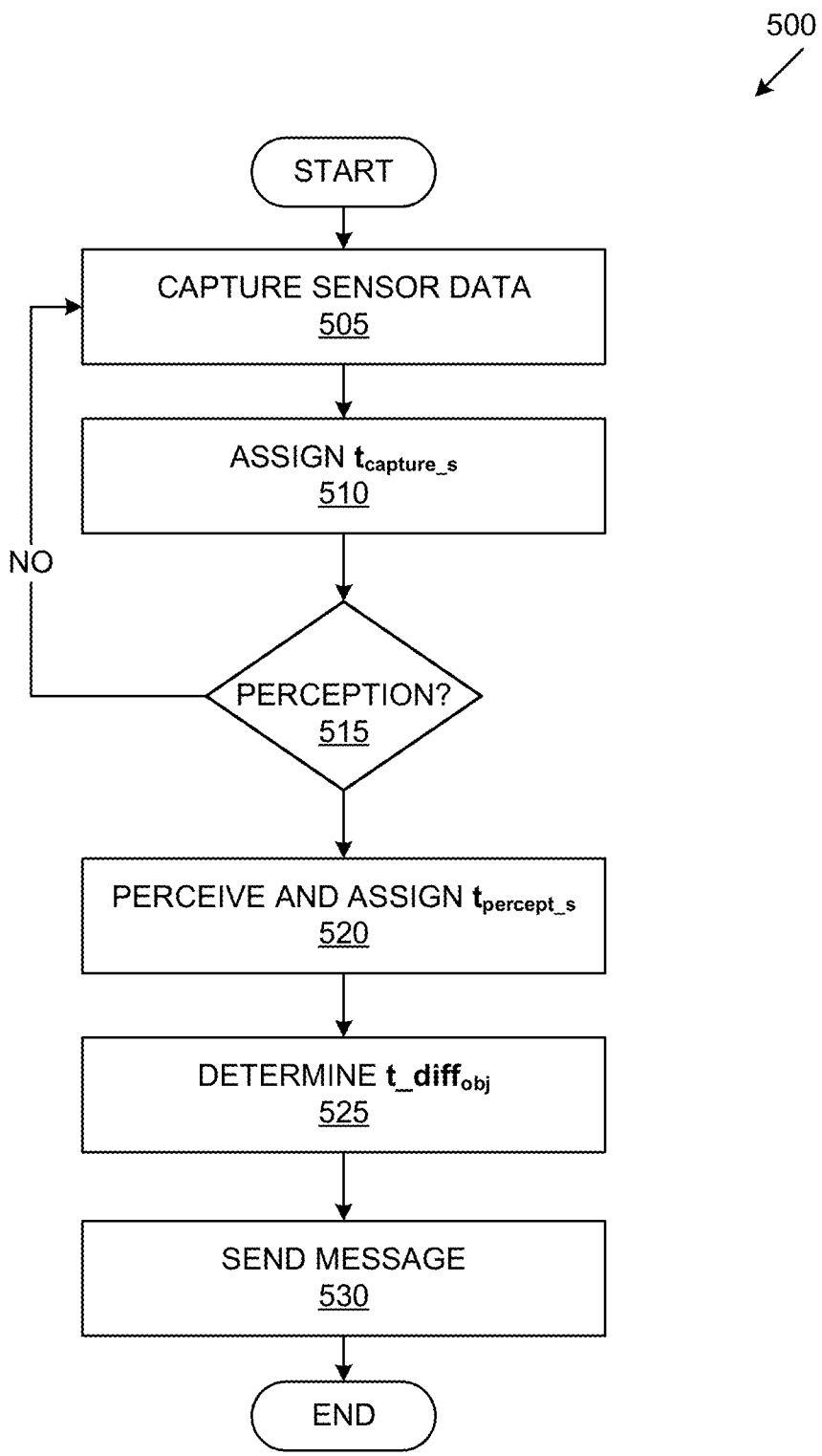
FIG. 5 is a flowchart of an exemplary process for a sender to acquire data and provide the data, including timestamp(s) for the data in a message to a receiver.

FIG. 5 is a flowchart of an exemplary process 500 for a sender 305 to acquire data and provide the data, including timestamp(s) for the data in a message 315 to a receiver 310. Steps or blocks of the process 500 may be executed by a computer 110, 155, according to instructions stored in a memory thereof.

The process 500 can begin in a block 505, in which one or more sensors 115, 145 in the sender 305 capture, i.e. acquire, data. For example, as explained above, sensors 115, 145 can be lidar or camera sensors, and data can include two or three dimensional image data, point cloud data, etc. Additionally or alternatively, sensors 115, 145 can acquire other kinds of data, such as radar data.

Next, in a block 510, the computer 110, 155 assigns, to the datum or set of data (e.g., a two-dimensional image, a lidar point cloud, etc.) acquired in the block 505, a timestamp $t_{capture\_s}$.

Next, in a block 515, the computer 110, 155 determines whether additional data is to be acquired before the computer 110, 155 attempts to identify one or more objects 210 and/or other physical phenomena, e.g., precipitation, etc., from sensor 115, 145 data. As will be recognized, sensors 115, 145 can acquire data on a substantially continuous basis, and different sensors 115, 145 may acquire data at different intervals or frequencies. For example, the computer 110, 155 may be programmed to collect data from different sensors 115, 145, e.g., radar, lidar, two-dimensional cameras, etc. A two-dimensional camera may gather data at a higher rate, e.g., 70 Hertz (e.g., 70 frames per second), than a rate of lidar point cloud generation, which could be 10 Hertz, for example. Therefore, to account for varying data collection rates of various sensors 115, 145, a computer 110, 155 could include instructions to periodically proceed to a perception or data fusion process to fuse data from respective different sensors 115, 145 to identify objects 210, e.g., once every 500 ms. For example, data fusion can be performed in a known manner in which various sources provide data to a data fusion process executed in a computer 110, 155, e.g. via wired or wireless connections and/or from data provided or determined in the computer 110, 155. A data fusion process in a computer 110, 155 can include programming to retrieve all data for fusion from a queue periodically, i.e., at specified times or intervals, and to the use the various data to make what can be referred to as an observation, e.g., to detect one or more objects. If additional data is to be acquired before proceeding to a perception step, then the process 500 returns to the block 505. Otherwise, the process 500 proceeds to a block 520.

In the block 520, the computer 110, 155 performs object perception, or what can be referred to as data fusion or sensor fusion, to perceive one or more objects 210, and assigns the timestamp $t_{percept\_s}$ to an object or objects 210 perceived in the block 520. Perceiving an object 210 can include generating data classifying the object 210, providing a size and/or shape, i.e., one or more dimensions, and/or providing a location, e.g., according to global geo-coordinates such as used by the GPS system, etc. Objects can be classified, i.e., an object type can be specified, according to predetermines classes or types, e.g., pedestrian, rock, vehicle, pothole, etc.

Next, in a block 525, the computer 110, 155 determines a timestamp adjustment, e.g., a value $t\_diff_{obj}$, as defined above for the object or objects perceived in the block 520, i.e., representing a difference between a timestamp for a time of data capture and a timestamp for a time of object 210 perception.

Next, in a block 530, the computer 110, 155 transmits a message 315 including data describing each object 210 determined in the block 520 as well as the respective value $t\_diff_{obj}$ for each object 210 as determined in the block 525. The message 315 can include data that is encoded and/or serialized according to known techniques, serialization of data structures or data objects into a format for storage, e.g., in a file, a memory, a buffer, etc., being well known. Further, encoding techniques are known, e.g., For example, vehicular communications commonly use ASN (abstract syntax notation) encoding rules, which are more generally used in telecommunications. Other example possible encoding/encapsulation schemes include Protocol Buffers (Google), CORBA, COM (Component Object Model), and the like. Once data is encoded and serialized, a message 315 can include one or more packets. Data packets, as are known, can include headers and payloads data about objects 210 and respective timestamps or values such as $t\_diff_{obj}$ for each object 210 can be included in a payload or payloads of a packet or packets in a message 315.

Following the block 530, the process 500 ends. Note however, that the process 500 could be repeated and/or operate substantially continuously, e.g., while a vehicle 105 is powered on and/or navigating, etc., and/or could operate substantially continuously for an infrastructure element 140.

Figure 6:
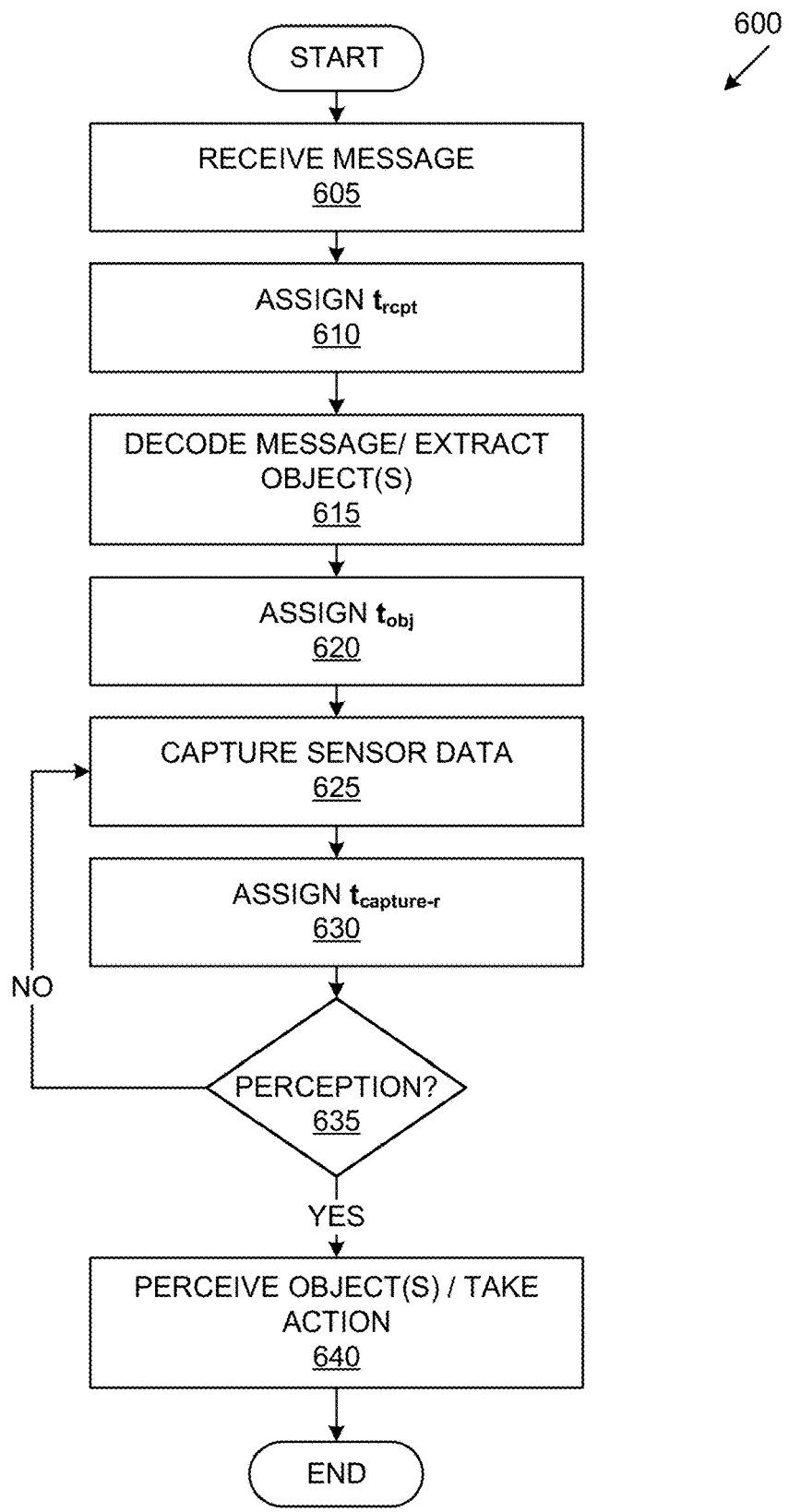
FIG. 6 is a flowchart of an exemplary process for a receiver to receive and process a message including data and timestamp(s) for the data.

FIG. 6 is a flowchart of an exemplary process for a receiver 310 to receive and process a message 315 from a sender 305, the message 315 including data and timestamp(s) for the data. Steps or blocks of the process 600 may be executed by a computer 110, 155, according to instructions stored in a memory thereof.

The process 600 can begin in a block 605, in which a receiver 310 receives a message 315, e.g., as transmitted by a sender 305 as described with respect to the process 500.

Next, in a block 610, a receiver 310 computer 110, 155 assigns a timestamp $t_{rcpt}$, i.e., specifying a time of receiving the message 315.

Next, in a block 615, the computer 110, 155 deserializes and/or decodes the message 315 to extract data about one or more objects 210 and respective timestamps or values such as a timestamp adjustment $t\_diff_{obj}$ for each object 210.

Next, in a block 620, the computer 110, 155, for each object 210 identified in the data extracted in the block 615, assigns a value representing an estimate of a time when the object was perceived in a sender 305 computer 110, 155, e.g., a value $t_{obj}=t_{rcpt} t\_diff_{obj}-L$, where L is an estimate of communication latency, i.e., an estimate of a time of transmission from the sender 305 to the receiver 310, as described above.

Next, in a block 625, one or more sensors 115, 145 in the receiver 310 capture, i.e. acquire, data. For example, as explained above, sensors 115, 145 can be lidar or camera sensors, and data can include two or three dimensional image data, point cloud data, etc. Additionally or alternatively, sensors 115, 145 can acquire other kinds of data, such as radar data.

Next, in a block 630, the computer 110, 155 assigns, to the datum or set of data (e.g., a two-dimensional image, a lidar point cloud, etc.) acquired in the block 625, a timestamp $t_{capture\_r}$.

Next, in a block 635, the computer 110, 155, in a manner as described above with respect to the block 515 of the process 500, determines whether additional data is to be acquired before the computer 110, 155 attempts to identify one or more objects 210 and/or other physical phenomena, e.g., precipitation, etc., from sensor 115, 145 data. If additional data is to be acquired, then the process 600 returns to the block 625. Otherwise, the process 600 proceeds to a block 640. Further, it is to be understood that the blocks 605-620, and the blocks 625-630, respectively, can run substantially concurrently or in parallel with one another, until a determination is made in the block 635 to proceed to the block 640.

In the block 640, the computer 110, 155 performs object perception, or what is sometimes referred to as data fusion, to perceive one or more objects 210 by combining the object data from the sender 305, according to the estimated sender capture timestamp $t_{obj}$, with data about the object 210 from the receiver 310, according to the $t_{capture\_r}$. That is, if $t_{obj}$ and $t_{capture\_r}$ are within a specified time of each other, e.g., 5 ms, then respective sender 305 and receiver 310 data can be included in a data fusion or object perception process. Further, the computer 110, 155 can transmit the fused object 210 data to other receivers 310, e.g., an infrastructure 140 can transmit or broadcast the data for receipt by one or more vehicles 105, which can then use the data to actuate one or more components 120, e.g., to operate on a road 205, e.g., steer, or brake, and/or accelerate. Similarly, a vehicle 105 as a receiver 310 could use the object 210 data to operate and/or could broadcast the data about the object 210 for receipt by an infrastructure element 140 and/or one or more other vehicles 105 (which could then in turn use the data for operation).

Following the block 640, the process 600 ends. Note however, that, like the process 500, the process 600 could operate substantially continuously and/or could be repeated.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   assign, in a message receiver, a receipt timestamp according to a time of wirelessly receiving a message;
   extract from the message sender object data about an object, including a timestamp adjustment for the object from a message sender;
   assign an estimated sender capture timestamp to the object by subtracting the timestamp adjustment and an estimated message transmission latency from the receipt timestamp;
   assign a receiver capture timestamp to receiver object data captured in the receiver; and
   combine the sender object data and the receiver object data according to the estimated sender capture timestamp and the receiver capture timestamp, thereby generating combined object data.

2. The system of claim 1, wherein the message receiver or the message sender is a computer in a vehicle.

3. The system of claim 1, wherein the message receiver or the message sender is a computer in a stationary infrastructure element.

4. The system of claim 1, the instructions further including instructions to actuate a component in a vehicle based on the combined object data.

5. The system of claim 1, the instructions further including instructions to transmit the combined object data.

6. The system of claim 1, wherein the timestamp adjustment is a difference between a time of object perception and object data capture.

7. The system of claim 1, wherein the message transmission latency is an empirically determined estimate of a time for the message to travel from the sender to the receiver.

8. The system of claim 1, wherein the sender object data includes a classification, a location, or a dimension of the object.

9. The system of claim 1, the instructions further including instructions to combine the sender object data and the receiver object data upon determining that the estimated sender capture timestamp and the receiver capture timestamp are within a specified threshold time of each other.

10. The system of claim 1, the instructions further including instructions to receive the message and extract the sender object data substantially concurrently with capturing the receiver object data and assigning the receiver capture timestamp.

11. A method, comprising:
    assigning, in a message receiver, a receipt timestamp according to a time of wirelessly receiving a message;
    extracting from the message sender object data about an object, including a timestamp adjustment for the object from a message sender;
    assigning an estimated sender capture timestamp to the object by subtracting the timestamp adjustment and an estimated message transmission latency from the receipt timestamp;
    assigning a receiver capture timestamp to receiver object data captured in the receiver; and
    combining the sender object data and the receiver object data according to the estimated sender capture timestamp and the receiver capture timestamp, thereby generating combined object data.

12. The method of claim 11, wherein the message receiver or the message sender is a computer in a vehicle.

13. The method of claim 11, wherein the message receiver or the message sender is a computer in a stationary infrastructure element.

14. The method of claim 11, further comprising actuating a component in a vehicle based on the combined object data.

15. The method of claim 11, further comprising transmitting the combined object data.

16. The method of claim 11, wherein the timestamp adjustment is a difference between a time of object perception and object data capture.

17. The method of claim 11, wherein the message transmission latency is an empirically determined estimate of a time for the message to travel from the sender to the receiver.

18. The method of claim 11, wherein the sender object data includes a classification, a location, or a dimension of the object.

19. The method of claim 11, further comprising combining the sender object data and the receiver object data upon determining that the estimated sender capture timestamp and the receiver capture timestamp are within a specified threshold time of each other.

20. The method of claim 11, further comprising receiving the message and extracting the sender object data substantially concurrently with capturing the receiver object data and assigning the receiver capture timestamp.

* * * * *